United States Patent [19]
Boie et al.

[11] Patent Number: 5,780,830
[45] Date of Patent: Jul. 14, 1998

US005780830A

[54] METHOD AND SYSTEM FOR DECODING DISTORTED IMAGE AND SYMBOLOGY DATA

[75] Inventors: Robert Albert Boie, Westfield; William Turin, East Brunswick, both of N.J.

[73] Assignee: Lucent Technologies Inc., Murray Hill, N.J.

[21] Appl. No.: 687,124

[22] Filed: Jul. 24, 1996

[51] Int. Cl.⁶ .................................................. G06K 7/10
[52] U.S. Cl. ................................. 235/462; 235/463
[58] Field of Search ........................... 235/462, 463, 235/472

[56] References Cited

U.S. PATENT DOCUMENTS

| | | | |
|---|---|---|---|
| 4,282,426 | 8/1981 | Neseem et al. | 235/463 |
| 5,150,414 | 9/1992 | Ng | 381/47 |
| 5,262,625 | 11/1993 | Tom et al. | 235/462 |
| 5,463,211 | 10/1995 | Arends et al. | 235/462 |

Primary Examiner—F. L. Evans
Attorney, Agent, or Firm—John M. Harman

[57] ABSTRACT

Disclosed is a system and method for reading and decoding distorted data, e.g., bar code label or other symbology data, by fitting a scanned signal model $j(t, \theta)$, using a Deterministic Expectation-Maximization (DEM) algorithm, to the measured or detected data signal $y(t)$. The DEM algorithm, which is a novel variation of the conventional Expectation-Maximization (EM) algorithm, enables the system and method according to the invention to determine the values of a plurality of parameters $\theta$ defining the scanned signal model $j(t, \theta)$ as it is being fitted to the measured data signal $y(t)$. Based on these values, characteristic information such as data elements or symbols encoded within the image data are generated using conventional signal processing techniques. The use of the DEM algorithm advantageously deblurs the signal by reducing the effects of intersymbol interference. In an alternative embodiment, the DEM algorithm is supplemented by a conventional zero crossings decoding technique. In this manner, the zero crossings technique is used to obtain initial parameter estimates for the DEM algorithm in determining the parameters $\theta$ of the scanned signal model $j(t, \theta)$.

19 Claims, 4 Drawing Sheets

METHOD AND SYSTEM FOR DECODING DISTORTED IMAGE AND SYMBOLOGY DATA

BACKGROUND OF THE INVENTION

1. Field of the Invention

The invention relates to methods and systems for processing distorted image and symbology data. More particularly, the invention relates to methods and systems for reading, decoding and recovering bar code symbols and other symbology data from representative signals.

2. Description of the Related Art

The use of symbology data is becoming increasingly prevalent in our society. For example, a particular bar coding arrangement known as the Universal Product Code (UPC) has been established as the industry standard for grocery, food processing and other retail industries. Discussions of this bar coding scheme and bar code reading methods and systems related thereto are found, e.g., in U.S. Pat. No. 5,262,625, issued to Tom et al., and in U.S. Pat. No. 4,282,426, issued to Naseem et al.

Generally, bar code labels use vertically aligned, alternating stripes of two colors, typically light absorbing, usually black, printed "bars" and light scattering (diffusely reflecting) "white" spaces. The label data is encoded in the relative widths of the alternating bars and spaces. Such relative width encoding allows label reading to be relatively insensitive to geometric effects such as label size, reading distance and to a certain extent, label orientation.

Label reading systems typically involve an optical scanner, a photodetector and associated signal processing (e.g., decoding) hardware and/or software. The scanner, which often includes a laser or other suitable light source, is modified optically (e.g., via a lens or lens system) to project a bright spot of light, having a certain size at a prescribed distance, that is moved across the bar code label. The photodetector, positioned approximately coaxial with the light source, measures the time-varying intensity of light backscattered from the label and converts it to a corresponding time-varying electrical signal current.

The system's signal processing then converts the time-varying electrical signal, which is an analog waveform, to a pulse width modulated digital signal. The digital signal is then transformed to a binary representation of the data, i.e., a sequence of numbers describing the widths of the alternating stripes of the bar code. The label data is interpreted therefrom using any one of a number of conventional decoding techniques.

The overall ability to read coded labels depends on the dimensions of the projected light spot relative to the size of the bars. Also, the intensity of the projected spot relative to the bar affects the systems ability to read because substantial noise sources are present. Laser power is limited by eye safety considerations and thus provides an upper limit on available signal intensity. It also provides a limit on the size of the field of view within which labels are successfully read.

Also, the finite size of the projected light spot introduces corresponding blurring in the bar code image. Such blurring includes intersymbol interference (also called convolution interference), which is the effect of light backscattered from bars adjacent to the bar of interest.

Conventional reading methods, which typically are based on linear filtering and/or feature detection, work well in reading bar code data if the blurring is small relative to the size of the bars. In such cases, reading performance is limited primarily by the signal-to-noise ratio. Yet, as relative blurring increases when the label moves further from focus, reading errors occur that are independent of the signal-to-noise ratio. Thus, in these cases, increasing the detected signal does not necessarily reduce such reading errors.

Conventional reading methods are limited effectively to cases in which blurring caused by intersymbol interference is small relative to the size of the label bars. In cases where the blurring is much more significant, conventional reading methods do not account for the increased impact that intersymbol interference blurring has on the overall reading accuracy of the system.

It is desirable to have available a system and method for reading data such as bar code data or other symbology data (e.g., scanned image data and optical character recognition data) that improve upon the deterministic distortions discussed above. Particularly, a system and method are desired that reduce intersymbol interference and other types of blurring that are independent of signal-to-noise ratio.

SUMMARY OF THE INVENTION

The invention is embodied in a system and method for reading and decoding distorted data, e.g., bar code label data, facsimile and other scanned image data having distortions therein. In particular, it is embodied in a system and method that decodes data such as bar code label data by fitting a scanned signal model $j(t, \theta)$, using a Deterministic Expectation-Maximization (DEM) algorithm, to a measured or detected data signal $y(t)$. The DEM algorithm, which is a novel variation of the conventional Expectation-Maximization (EM) algorithm, enables the system and method according to the invention to determine the values of a plurality of parameters $\theta$ defining the scanned signal model $j(t, \theta)$ as it is being fitted to the measured data signal $y(t)$. Based on these values, characteristic information such as data elements or symbols encoded within the image data are generated using conventional signal processing techniques. The use of the DEM algorithm advantageously deblurs the signal by reducing the effects of intersymbol interference. In an alternative embodiment, the DEM algorithm is supplemented by a conventional zero crossings decoding technique. In this manner, the zero crossings technique is used to obtain initial parameter estimates for the DEM algorithm in determining the parameters $\theta$ of the scanned signal model $j(t, \theta)$.

BRIEF DESCRIPTION OF THE DRAWINGS

In the drawings:

FIG. 2b is a schematic diagram of a pulse train output from the bar code reading system of FIG. 2a;

DETAILED DESCRIPTION

Figure 1:
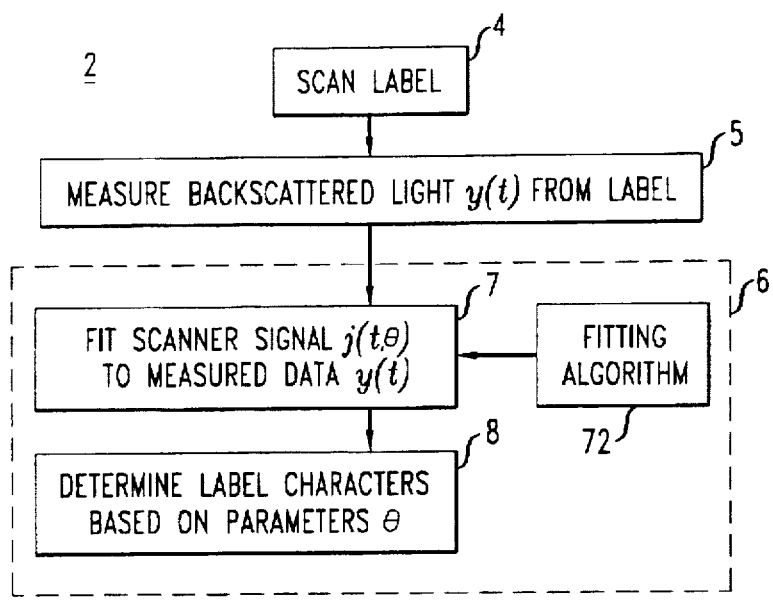
FIG. 1 is a simplified block diagram of a data label reading method in which aspects of the invention find application.

In the following description similar components are referred to by the same reference numeral for clarity and consistency among the drawings.

The invention is described primarily in terms of a particular class of embodiment, namely, bar code readers and methods of reading bar code labels. However, the invention is not thus limited, as will be appreciated by those skilled in the art.

FIG. 1 illustrates, in simplified block diagram form, the inventive data label reading method 2 described herein. The first step 4 of the method is to scan a label using an appropriate scanner. The label is, e.g., a bar code label, scanned image data or other symbology data potentially having distortion therein. As discussed previously, scanning the label involves moving a projected spot of light across the label. The light backscattered from the label is indicative of the label's pattern of bars and spaces.

The next step 5 in the method is to measure the light y(t) backscattered from the label using a photodetector that generates an electrical signal based on the intensity of the measured light. The backscattered light varies over time as the projected light from the scanner moves across the label.

Once the measured data signal y(t) has been captured, characteristic information in the measured data signal y(t) is determined using a decoding step 6. For example, in the case of bar code labels, such determination includes decoding the symbology data encoded in the label data as interpreted from the measured data signal y(t). As mentioned previously, conventional decoding steps are based on linear filtering or data features within the measured data signal y(t).

However, the inventive method described herein decodes the measured data signal y(t) by fitting a scanned signal model j(t, θ) to the measured data signal y(t) (shown generally as step 7) and then (in step 8) interpreting the encoded label data from the scanned signal model j(t, θ).

The scanned signal model j(t, θ) is a model based on a typical or ideal measured label signal. The scanned signal model j(t, θ) has a plurality of variable parameters θ that varies the accuracy of the fit of the scanned signal model j(t, θ) to the actual measured data signal y(t). Also, the accuracy with which the scanned signal model j(t, θ) fits the actual measured data signal y(t) depends on, e.g., the use of a fitting algorithm (shown generally as 72).

Once the scanned signal model j(t, θ) has been fitted appropriately to the actual measured data signal y(t), the final portion (step 8) of the decoding step 6 is to interpret the label data based on the values of the parameters θ used in fitting the model to the scanned signal model j(t, θ) to the measured data signal y(t).

Figure 2A:
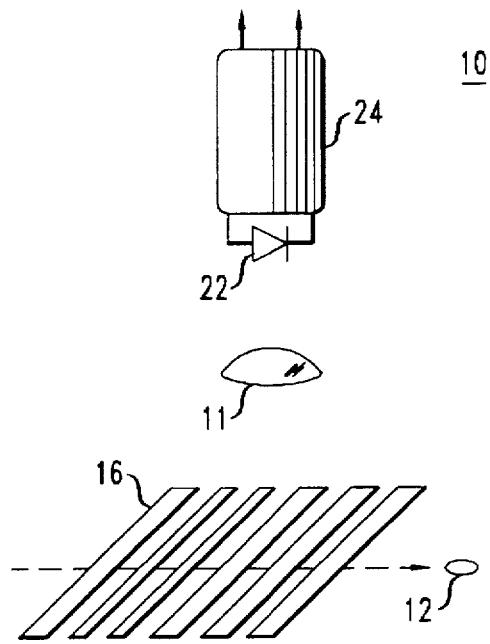
FIG. 2a is a schematic diagram of a bar code reading system in which aspects of the invention find application.
Figure 2B:
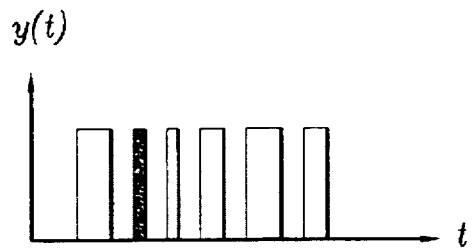
Figure 3:
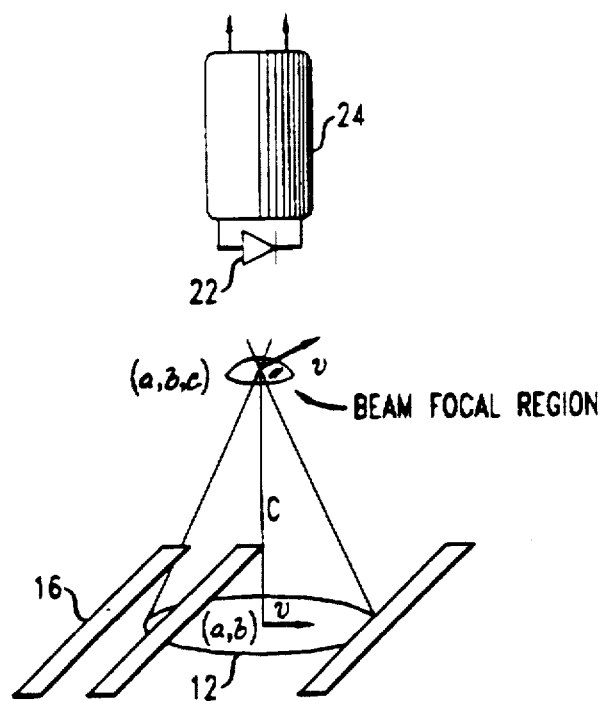
FIG. 3 is a detailed view of bar code scanner light as it relates to a portion of a bar code label.

Referring now to FIGS. 2–3, a schematic diagram of a data reading system 10, e.g., a bar code reading system, is shown. As discussed previously, an optical scanner (not shown) projects a bright spot 12 of light that moves across (shown generally as 14) a label 16 of interest, e.g., a bar code label or other symbology data label such as printed characters, symbols or graphical information. A photodetector 22, with light collection lens 11, measures the time-varying intensity of backscattered light from label 16 and converts it to a corresponding time-varying measured or detected data signal y(t), e.g., an electrical signal current i(t).

Then, as will be discussed in greater detail later, a bar code scanner or receiver 24 reads and processes the time-varying measured data signal y(t) to output a rectangular pulse train (shown generally as 26 in FIG. 2b) representative of label 16. From pulse train 26, the data elements or symbols encoded in the bar code label are determined in a conventional manner.

At a given point in time during reading of label 16 by photodetector 22, the measured data signal, y(t), is the sum of elemental contributions of individual light intensities characterized by a point spread function h(ξ, η, a, b, c) of light reflected from the point (ξ, η) if beam spot 12 is centered at (a, b, 0) and the beam focal region is at a distance c above label 16. Thus:

$$y(t) = \int \int_A h(\xi,\eta,a,b,c) m(\xi,\eta) d\xi d\eta$$

where a, b and c are functions of time and where m(ξ, η) is the printed source image. The point spread function h(ξ, η, a, b, c) is assumed to be symmetrical and typically is modeled by a conventional Gaussian distribution density:

$$h(\xi,\eta,a,b,c) = k e^{-\frac{(\xi-a)^2 + (\eta-b)^2}{2\sigma(c)^2}}$$

where σ(c) is proportional to the beam width and (a, b) are the coordinates of the beam center. By proper translation and scaling, and without loss of generality, the functions are assumed to be probability density functions. Thus, it is desirable to solve the inverse problem, i.e., to restore the undistorted image m(ξ, η) from its distorted, scanned image, e.g., measured data signal y(t).

In the case of bar code data, assuming, e.g., constant velocity of beam movement across label 16 and a sufficiently large label 16 relative to beam spot 12, the measured data signal y(t) is modeled by receiver 24 as:

$$j(t,\theta) = \int_{-\infty}^{\infty} \phi(t - x, \sigma) s(x, \lambda) dx$$

where s(x, λ) is a general form of the input signal to be obtained from the measured data signal y(t), θ={σ, λ} is a parametric vector to be recovered from the measured data signal y(t), and φ(t, σ) is a Gaussian impulse response of backscattered light having the form:

$$\phi(t,\sigma) = \frac{1}{\sqrt{2\pi}\,\sigma} e^{-\frac{t^2}{2\sigma^2}}$$

where σ is the point spread value, which is characteristic of the point spread function of the light spot 12 in the decoding system 10.

If $a_1, a_2, \ldots, a_n$ is a binary representation of a bar code and λ is a plurality of parameters including, e.g., $a_1, a_2, a_n, \ldots, t_1$ and T, the general form input signal s(x, λ) obtained from the measured data signal y(t) is defined as:

$$s(x,\lambda) = \frac{1}{T} \sum_{k=1}^{n} a_k p_T(x - t_k),$$

$$t_k = t_1 + (k - 1)T$$

where $p_T(x)$ is a rectangular pulse of width T corresponding to a bar in which $p_T(x)=1$ if $|x| \leq 0.5T$, otherwise $p_T(x)=0$.

From these equations, it is seen that the measured data signal y(t) can be modeled linearly.

Further derivation of the model j(t, θ) yields, generally:

$$j(t,\theta) = \sum_{k=1}^{n} a_k u(t - t_k, T, \sigma)$$

where:

$$u(t,T,\sigma) = \frac{1}{T} \int_{-0.5T}^{0.5T} \phi(t - x, \sigma) dx$$

As shown generally in FIGS. 2–3, the scanned signal model j(t, θ) is used to generate pulse train 26 representative of label 16 from detected data signal y(t) received by photodetector 22 and processed by receiver 24. Such is accomplished by determining coefficients $a_1, a_2, \ldots, a_n$ of detected data signal y(t) by fitting scanned signal model j(t, θ) to detected data signal y(t).

Conventionally, in fitting the scanner model j(t, θ) to the detected data signal y(t), signal processing methods of bar code reading systems assume that the relative blurring caused by light backscattered from adjacent bars of label 16 is insignificant. That is, a blur factor (σ/T) indicative of the relative point spread of light compared to the width of the label bars conventionally is assumed to be relatively small. In using such assumption, $j(t_k, \theta) \approx a_k u(t-t_k, T, \sigma)$ and conventional bar code recovery is accomplished, e.g., by sampling j(t, θ) at moments $t_k$, or by using intersections of $u(t-t_k, T, \sigma)$ with its mean value, or by using zero crossings of its second derivative (e.g., see U.S. Pat. No. 5,463,211).

However, intersymbol interference typically is not insignificant. Still, conventional bar code reading methods and systems fail to take its effects into account. That is, the contribution or effect of light backscattered from adjacent "bar" or "space" elements $a_{k-i}u(t-t_{k-i}, T, \sigma)$ and $a_{k+i}u(t-t_{k+i}, T, \sigma)$ for i=1, 2, . . . on the overall decoding accuracy is not considered by conventional bar code reading systems. Additionally, other sources of interference and noise provide distortion to the measured data signal y(t).

To fit the scanned signal model j(t, θ) to the measured data signal y(t) in the face of this blurring and other distortion, an optimization criterion is needed. An embodiment of the invention uses a deterministic expectation-maximization (DEM) algorithm to fit the scanned signal model j(t, θ) to the measured data signal y(t).

The DEM algorithm is a novel generalization of the expectation-maximization (EM) algorithm, which is a known iterative method useful for finding maximum likelihood estimates of statistical model parameters from experimental data (e.g., see U.S. Pat. No. 5,150,414). Advantageously, the DEM algorithm is much more general and has more applicability than, e.g., the EM algorithm of Dempster et al. (A. P. Dempster, N. M. Laird, and D. B. Rubin, "Maximum likelihood from incomplete data via the EM algorithm," *Journ. Royal Statist. Ass.*, Vol. 76, 1977, pp. 341–353).

Being more general than the conventional EM algorithm, the DEM algorithm provides solutions for what are known as positive inverse problems of finding parameters of nonlinear models by fitting them to other models. Special cases of these problems include, e.g., approximation of a nonnegative function with a parametric family of probability density functions, solving systems of non-linear equations, and solving systems of non-linear integral equations.

Positive inverse problems are formulated, for example, in a manner of recovering an object s(x, λ) from a parametric family of objects from its measured data signal y(t) having distorted image data, if the distortion can be modeled as:

$$j(t,\theta) = \int_A s(x,\lambda) h(x,t,\mu) dx$$

where h(x, t, µ) is the point spread function, x is an n dimensional vector, t is an m dimensional vector, and parameter θ=(λ, µ) is also a multidimensional vector. In particular, if x and t are two-dimensional vectors (x, t∈$R^2$), then the model j(t, θ), which in data reading applications is referred to as the scanned signal model or the image distortion model, is interpreted as a distorted image of a planar object s(x, λ).

If parameter θ is known, s(x, λ) is capable of being found as a solution of the previous integral equation. However, in the majority of practical cases, the parameter θ is not known. Therefore, solutions are obtainable by minimizing the divergence between the measured data signal y(t) having distorted image data and its accompanying model j(t, θ), e.g., by minimizing the Kullback-Leibler divergence:

$$K(y\|j_\theta) = \int_{-\infty}^{\infty} y(t) \log \frac{y(t)}{j(t,\theta)} dt$$

between the measured data signal y(t) and its model j(t, θ). The Kullback-Leibler divergence is known to those skilled in the mathematical arts and is described, e.g., in the book S. Kullback, *Information Theory and Statistics*, John Wiley & Sons, New York, 1959.

Without loss of generality, y(t) and j(t, θ) are assumed to be probability density functions. Since y(t) does not depend on θ, minimization of K(y $\|j_\theta$) is equivalent to the maximization of the mean log-likelihood function:

$$L(y\|j_\theta) = \int_{-\infty}^{\infty} y(t) \log j(t,\theta) dt.$$

The solution of the inverse problem is determined by $\hat{\theta}$=arg max L(y $\|j_\theta$). Although this equation typically is difficult to solve directly, the DEM algorithm is useful for finding the maximum of the function iteratively. More specifically, the DEM algorithm is based on presenting L(θ) in the decomposed form L(θ)=Q(θ, $\theta_p$)−H(θ, $\theta_p$), where Q(θ, $\theta_p$) and H(θ, $\theta_p$) are auxiliary functions of the observed data y. If $\theta_{p+1}$ can be found such that Q($\theta_{p+1}$, $\theta_p$)>Q($\theta_p$, $\theta_p$) and H($\theta_{p+1}$, $\theta_p$)≦H($\theta_p$, $\theta_p$), then L($\theta_{p+1}$)>L($\theta_p$). In this manner, a sequence $\theta_1, \theta_2, \ldots, \theta_p$ is created that increases L(θ) monotonically. The sequence converges to a maximum of L(θ) if the functions and their defined region satisfy very mild regularity conditions, which are known to those skilled in the art and are found, e.g., in the book W. I. Zangwill, *Nonlinear Programming: A Unified Approach*, Prentice Hall, Englewood Cliffs, N.J., 1969, pp. 91–92.

If H($\theta_p$, $\theta_p$) is a global maximum of H(θ, $\theta_p$), then L(θ) increases only if Q(θ, $\theta_p$) increases. Thus, the DEM algorithm:

$$\theta_{p+1} = \text{arg max } Q(\theta, \theta_p)$$

monotonically increases L(θ) and finds its maximum under mild regularity conditions.

The auxiliary functions Q(θ, $\theta_p$) and H(θ, $\theta_p$) are not uniquely identified. Their selection is based on the simplicity of finding a maximum of Q(θ, $\theta_p$), which directly affects the algorithm convergence rate. The auxiliary functions are found, e.g., by:

$$\log j(x, \theta) = \log q(z, \theta) - \log p(z, \theta)$$

where $z=(s, x)$ is an augmented variable, $p(z, \theta)$ is its probability density, and $q(z, \theta) = p(z, \theta) j(t, \theta)$. Then, the auxiliary functions are constructed as:

$$Q(\theta, \theta_p) = \int_{s,x} \log\{q(z,\theta)\} p(z,\theta_p) y(x) ds$$

$$H(\theta, \theta_p) = \int_{s,x} \log\{p(z,\theta)\} p(z,\theta_p) y(x) ds$$

Since $H(\theta, \theta_p)$ attains its global maximum at $\theta = \theta_p$, the DEM algorithm is applied to find a maximum of $L(y||j_\theta)$ iteratively.

Alternatively, since a maximum of $L(\theta)$ is a minimum of $-L(\theta)$, the DEM algorithm is useful for finding a minimum. Therefore, the DEM algorithm is adaptable to applications where a minimum rather than a maximum is sought.

The conventional EM algorithm is one specific application of the DEM algorithm. Specifically, when there are observations $X_1, X_2, \ldots X_N$ of a random, m dimensional variable x with the probability density function $j(t, \theta)$, the EM algorithm is obtained from the DEM algorithm when $y(t)$ is defined as:

$$y(t) = \sum_{k=1}^{N} \delta(t - x_k)/N$$

where $\delta(t-x_k)$ is the Dirac delta-function, which is known in mathematical physics and applied mathematics.

When the DEM algorithm is used in, e.g., bar code reading methods and systems, the auxiliary function $Q(\theta, \theta_p)$ is expressed, e.g., as:

$$Q(\theta, \theta_p) = \int_{-\infty}^{\infty} \int \log\{\phi(t-x,\sigma) s(x)\} w(t,x,\theta_p) dt dx$$

where $w(t, x, \theta_p) = \phi(t-x, \sigma) s_p(x) y(t)/j(t, \theta_p)$.

If the point spread value $\sigma$ is known, the scanned signal model $j(t, \theta)$ is a linear function of $s(x)$ and it is not difficult for those skilled in the art to find a maximum of function $Q(\theta, \theta_p)$. The result is the following EM algorithm (i.e., a specific, "linear" version of the inventive DEM algorithm):

$$s_{p+1}(x) = \int_{-\infty}^{\infty} w(t,x,\theta_p) dt = s_p(x) \int_{-\infty}^{\infty} r(t,\theta_p) \phi(t-x,\sigma) dt$$

where $r(t, \theta) = y(t)/j(t, \theta_p)$. This particular algorithm was introduced by Vardi and Lee (e.g., see Y. Vardi and D. Lee, "From image deblurring to optimal investments: maximum likelihood solutions for positive linear inverse problems," *Journ. Royal Statist. Soc.*, Vol. 55, 1993, pp. 569–612) for solving general linear inverse problems (i.e., problems unrelated to recovering bar code symbols and other symbology data).

Figure 4:
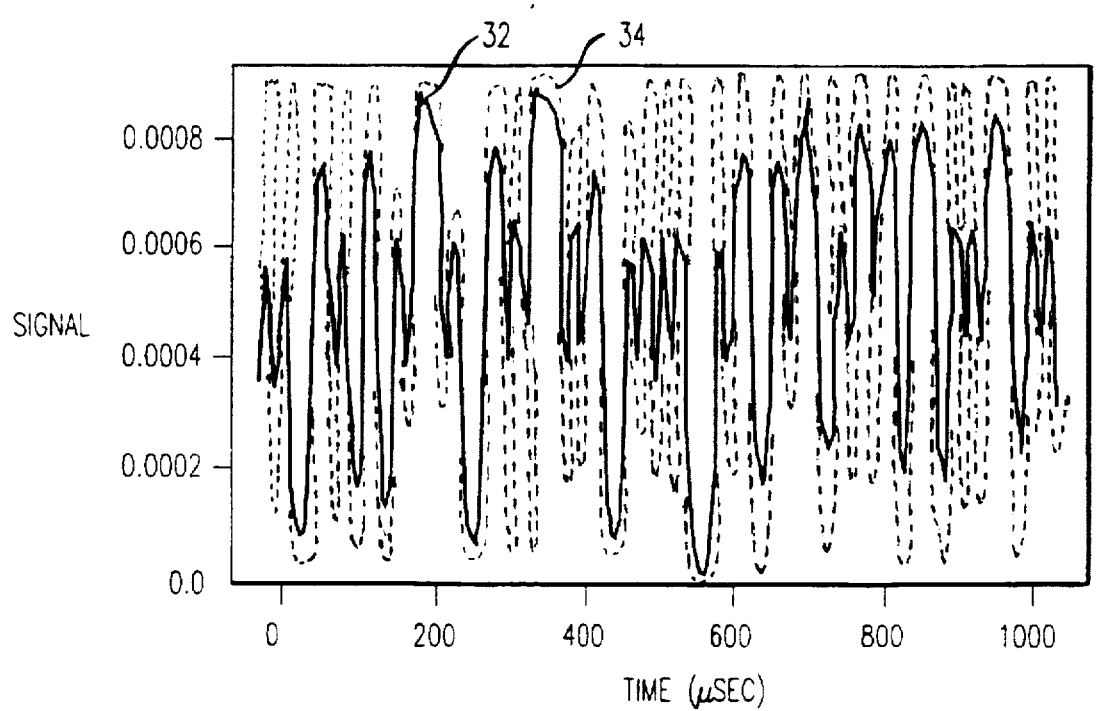
FIG. 4 is a graphical diagram of the measured data signal $y(t)$ and the scanned signal model $j(t, \theta)$ fitted thereto using a conventional decoding technique.

FIG. 4 illustrates the results of an application of the Vardi and Lee EM algorithm solving a linear inverse problem (using a known point spread value $\sigma$) after approximately 100 iterations. As shown, the transitions of the measured or received data signal y(t) 32 (solid line) is moderately well modeled by a scanner model signal 34 (dashed line) fitted thereto. Furthermore, scanner model signal 34 depicts what would be a deblurred measured signal and outputs a partial rectangular pulse train useful by subsequent processing in decoding particular symbology characters therefrom.

However, the Vardi and Lee "linear" version of the algorithm provides no useful solution to non-linear inverse problems. That is, the Vardi and Lee algorithm is not helpful when the point spread value $\sigma$ is unknown and, as mentioned previously, the point spread value $\sigma$ usually is not known, because it depends on the scanner distance from the bars in the bar code label, which distance is a random variable.

When the point spread value $\sigma$ is unknown, the problem becomes non-linear and, conventionally, a unique solution for $s(x)$ is not available. However, according to the invention described herein, with the use of a data-characteristic model, e.g., $j(t, \theta)$, a unique solution is obtainable for non-linear inverse problems by fitting the data-characteristic model to the collected data using the DEM algorithm and determining the data, i.e., solving for $s(x)$, based on the parameter values of the data-characteristic model.

Accordingly, for applications such as decoding bar code label data and other symbology data, the use of the scanned signal model $j(t, \theta)$ enables unique solutions to be obtained for the collected data. Although $\sigma$ still is unknown and the inverse problem remains non-linear, the number of parameters needed to express the data-characteristic model is limited sufficiently so that unique solutions are available for the collected data when the data-characteristic model is fitted thereto.

Thus, a form of the DEM algorithm more general than the EM algorithm is useful for solving non-linear inverse problems. Specifically, the DEM algorithm is obtained by maximizing the function $Q(\theta, \theta_p)$, where the parameters a, $\sigma$, t and T are defined as:

$$a_{k,p+1} = \frac{1}{T} \int_{t_k - 0.5T_p}^{t_k + 0.5T_p} s_p(x) dx$$

$$\sigma\{p+1\}^2 = \int_{-\infty}^{\infty} \int_X (t-x)^2 w(t,x,\theta_p) dt dx$$

$$\{t_{1,p+1}, T_{p+1}\} \arg\max \sum_{k=1}^{n} \log\left\{\frac{a_{k,p+1}}{T}\right\} \int_{t_k - 0.5T}^{t_k + 0.5T} w(t,x,\theta_p) dt dx$$

Typically, $t_{1,p+1}$ and $T_{p+1}$ are difficult to determine from these equations. However, by using an approximation $u(t-t_k, T, \sigma) \approx \phi(t-t_k, \sigma)$ and the relationship $t_k = t_1 + (k-1)T$, the inventive DEM algorithm is obtained by maximizing the function $Q(\theta, \theta_p)$, where the parameters $a_1, a_2, \ldots, a_n, \sigma, t_1$ and T are defined as:

$$a_{k,p+1} = a_{k,p} v_{k,p}$$

$$\sigma_{p+1}^2 = \sum_{k=1}^{n} a_{k,p+1} \sigma_{k,p+1}^2$$

$$t_{1,p+1} = (MB_p - M_{1,p} A_p)/(B_p - A_p^2)$$

$$T_{p+1} = (M_{1,p} - A_p M)/(B_p - A_p^2)$$

where $$A_p = \sum_{k=2}^{n} (k-1) a_{k,p+1},$$

-continued $$B_p = \sum_{k=2}^{n} (k-1)a_{k,p+1},$$

$$M = \int_{-\infty}^{\infty} t\, y(t)dt,$$

$$M_{1,p} = \sum_{k=2}^{n} (k-1)a_{(k,p+1)}t_{k,p+1}$$

$$v_{i,p} = \int_{-\infty}^{\infty} y(x)\phi(x - t_{i,p},\sigma_{i,p})/j(x;\theta_p)dx,$$

$$\sigma^2_{i,p+1} = \frac{1}{v_{i,p}} \int_{-\infty}^{\infty} (x - t_{p,i})^2 y(x)\phi(x - t_{i,p},\sigma_{i,p})/j(x;\theta_p)dx$$

In an alternative embodiment of the invention, the use of the DEM algorithm as part of the bar code recovery method and system as described herein is supplemented by the use of conventional zero crossings determinations, which typically are used alone in some conventional bar code recovery methods. Specifically, the conventional zero crossings technique is used to determine the initial values (i.e., for p=0) of the parameters $\theta_0 = \{t_{1,0}, T_0, \sigma_0, a_{1,0}, a_{2,0}, \ldots, a_{n,0}\}$. If these parameter values are suitable for purposes of fitting the scanned signal model j(t, θ) to the received data signal y(t) (i.e., if the recovered bar code from the scanned signal model fit is determined to be a proper bar code), then no further signal processing is needed. Otherwise, the initial zero crossings parameters $\theta_0 = \{t_{1,0}, T_0, \sigma_0, a_{1,0}, a_{2,0}, \ldots, a_{n,0}\}$ are used only as initial parameter estimates for the DEM algorithm.

Figure 5:
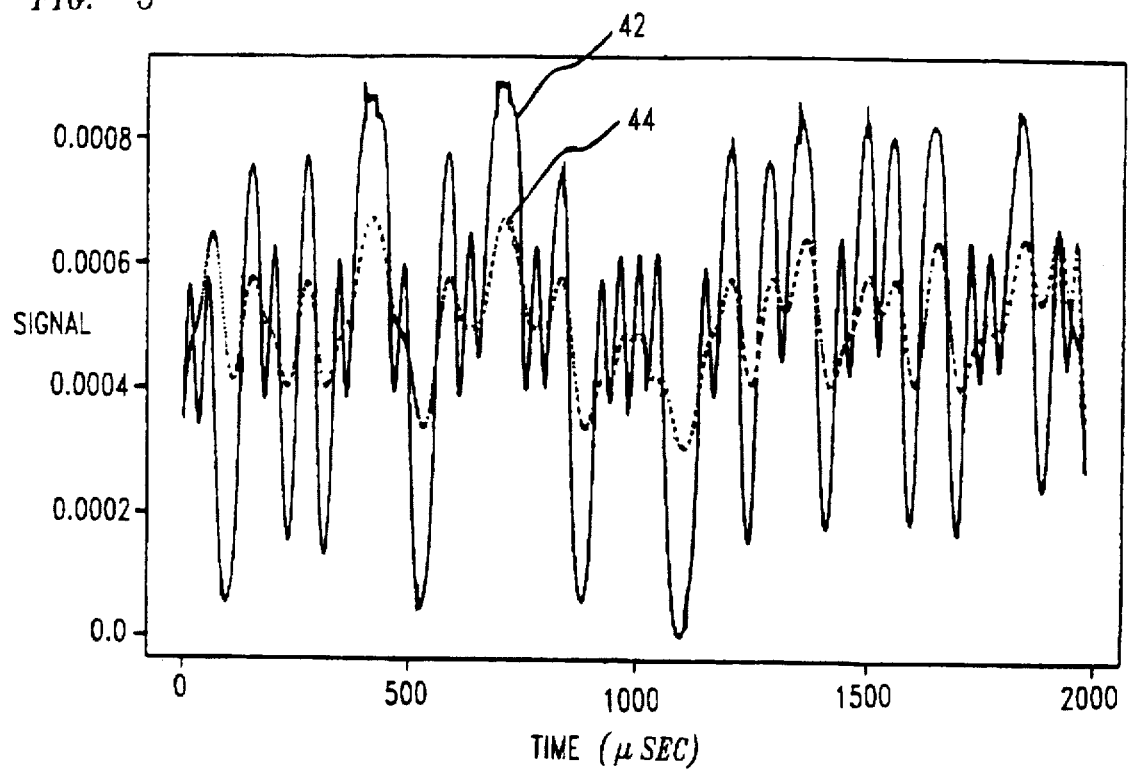
FIG. 5 is a graphical diagram of the measured data signal $y(t)$ and the scanned signal model $j(t, \theta)$ fitted thereto using a conventional zero crossing processing technique.

For example, FIG. 5 depicts a received data signal y(t) 42 as compared to a corresponding scanner signal model fitted signal 44 that has used parameter values determined by a conventional zero crossings technique. In this specific case, a recovered bar code based on the scanner signal model fitted signal 44, as shown, would be deemed improper.

Figure 6:
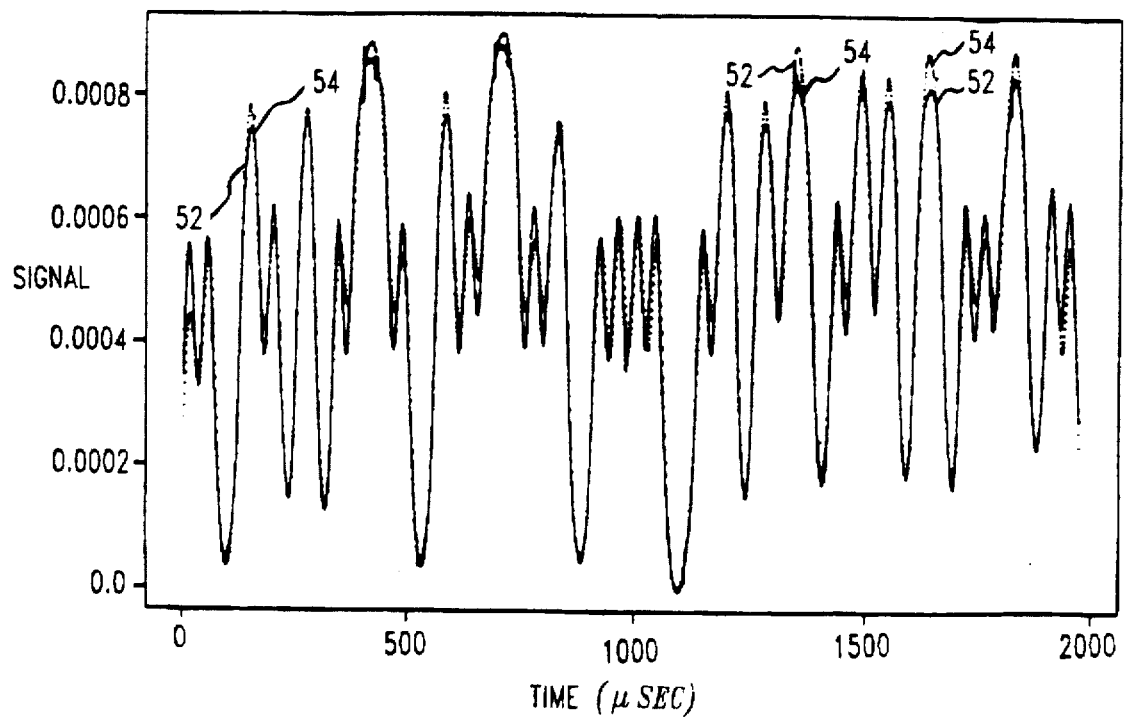
FIG. 6 is a graphical diagram of the measured data signal $y(t)$ and the scanned signal model $j(t, \theta)$ fitted thereto according to an embodiment of the invention.
Figure 7:
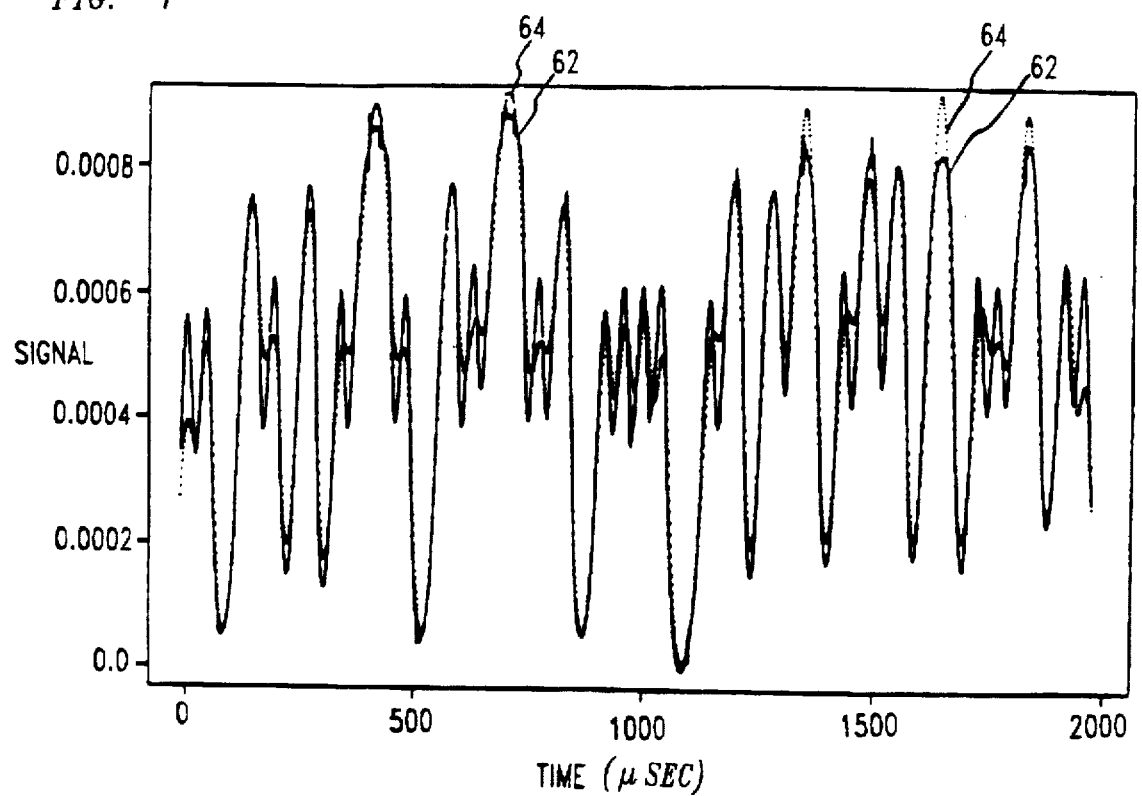
FIG. 7 is a graphical diagram of the measured data signal y(t) and the scanned signal model j(t, θ) fitted thereto according to an alternative embodiment of the invention.

By comparison, FIG. 6 depicts a scanner signal model fitted signal 54 (after 40 iterations) to a received data signal y(t) 52 using the DEM algorithm. Moreover, as shown in FIG. 7, when the zero crossings parameters $\theta_0 = \{t_{1,0}, T_0, \sigma_0, a_{1,0}, a_{2,0}, \ldots, a_{n,0}\}$ are used as initial parameter estimates for the DEM algorithm, a scanner signal model fitted signal 64 satisfactorily models a received data signal y(t) 62 after only 11 iterations. In such case, the use of the DEM algorithm in fitting the scanner signal model j(t, θ) to the received data signal y(t) is improved (in terms of both accuracy and number of iterations required) when parameters determined by a zero crossings technique are used as the initial parameter estimates for the DEM algorithm.

It is to be understood that the DEM algorithm has many applications not discussed specifically herein but that are obvious to those skilled in the art. For example, the DEM algorithm is useful in the minimization of the number of states of hidden Markov models used in speech and handwriting recognition, the optimization of the structure of natural language models, and for communication channel blind equalization.

Thus, post-computational activity can be of a variety of types, but will generally be similar to corresponding prior art activity. Exemplarily, it includes, for example, the display of information (e.g., a price of the item having a bar code label) or a change in the state of a physical system (e.g., opening a security gate).

It will be apparent to those skilled in the art that other changes and substitutions can be made to the symbology data decoding method and system described herein without departing from the spirit and scope of the invention as defined by the appended claims and their full scope of equivalents.

What is claimed is:

1. A method for determining characteristic information from a signal, said method comprising the steps of:

providing a measured data signal y(t) representative of a plurality of input data capable of including distortions therein;

fitting a scanned signal model j(t, θ) having a plurality of parameters θ to said measured data signal y(t) by adjusting the values of at least one of said parameters θ, said scanned signal model j(t, θ) capable of having a nonlinear relationship to said plurality of parameters θ.

said fitting step comprising using a DEM algorithm to determine the values of at least one of said plurality of parameters θ; and determining symbology information from said scanned signal model j(t, θ) based on the values of said parameters θ when said scanned signal model j(t, θ) is fitted to said measured data signal y(t).

2. The method as recited in claim 1, wherein said DEM algorithm is:

$$\theta_{p+1} = \arg\max Q(\theta, \theta_p), \text{ for } p=0, 1, \ldots,$$

where $Q(\theta, \theta_p)$ is an auxiliary function of said parameters θ.

3. The method as recited in claim 2, wherein said measured data signal y(t) is obtained by projecting light across an object and detecting the light backscattered from said object, wherein said fitting step uses said DEM algorithm to obtain an input signal s(x) from said measured data signal y(t), wherein:

$$Q(\theta,\theta_p) = \int_{-\infty}^{\infty} \int \log\{\phi(t-x,\sigma)s(x)\}w(t,x,\theta_p)dtdx,$$

where $w(t, x, \theta_p) = \phi(t-x, \sigma)s_p(x)y(t)/j(t, \theta_p)$, and where $\phi(t, \sigma)$ is a Gaussian impulse response of backscattered light from said object having the form:

$$\phi(t,\sigma) = \frac{1}{\sqrt{2\pi}\,\sigma} e^{-\frac{t^2}{2\sigma^2}},$$

where σ is a point spread value.

4. The method as recited in claim 1, wherein said fitting step uses said DEM algorithm to obtain an input signal s(x, λ) defined as:

$$s(x,\lambda) = \frac{1}{T} \sum_{k=1}^{n} a_k p_T(x - t_k),$$

from said measured data signal y(t), where $a_k$ is a binary representation of said input data and $p_T(x)$ is a rectangular pulse of width T corresponding to a bar in which $P_T(x)=1$ if $|x| \leq 0.5T$, otherwise $p_T(x)=0$, said input signal s(x, λ) having a plurality of parameters capable of being solved by said DEM algorithm, said plurality of parameters defined as:

$$a_{k,p+1} = a_{k,p}v_{k,p}$$

-continued $$\sigma_{p+1}^2 = \sum_{k=1}^{n} a_{k,p+1}\sigma_{k,p+1}^2$$

$$t_{l,p+1} = (MB_p - M_{l,p}A_p)/(B_p - A_p^2)$$

$$T_{p+1} = (M_{l,p} - A_p M)/(B_p - A_p^2),$$

where $$A_p = \sum_{k=2}^{n} (k-1)a_{k,p+1},$$

$$B_p = \sum_{k=2}^{n} (k-1)a_{k,p+1},$$

$$M = \int_{-\infty}^{\infty} t\, y(t)dt,$$

$$M_{l,p} = \sum_{k=2}^{n} (k-1)a_{k,p+1}t_{k,p+1}$$

$$v_{l,p} = \int_{-\infty}^{\infty} y(x)\phi(x - t_{l,p},\sigma_{l,p})/j(x;\theta_p)dx$$

$$\sigma_{l,p+1}^2 = \frac{1}{v_{l,p}} \int_{-\infty}^{\infty} (x - t_{p,l})^2 y(x)\phi(x - t_{l,p},\sigma_{l,p})/j(x;\theta_p)dx.$$

5. The method as recited in claim 1, wherein said fitting step includes minimizing the Kullback-Leibler divergence defined as:

$$K(y\|j\theta) = \int_{-\infty}^{\infty} y(t)\log\frac{y(t)}{j(t,\theta)}\, dt.$$

6. The method as recited in claim 1, wherein said fitting step includes maximizing a mean log-likelihood function defined as:

$$L(y\|j\theta) = \int_{-\infty}^{\infty} y(t)\log j(t,\theta)dt.$$

7. The method as recited in claim 1, wherein said fitting step further comprises using zero crossings of said measured data signal y(t) to determine initial values for at least one of said plurality of parameters θ, said initial parameter values usable by said DEM algorithm as initial estimates for said parameter values.

8. The method as recited in claim 1, wherein said determining step further comprises generating a pulse train corresponding to said scanned signal model j(t, θ) when fitted to said measured data signal y(t) and identifying said characteristic information based on said pulse train.

9. The method as recited in claim 1, wherein said measured data signal y(t) is obtained by projecting light across an object and detecting the light backscattered from said object, and wherein said scanned signal model is defined as:

$$j(t,\theta) = \int_{-\infty}^{\infty} \phi(t - x,\sigma)s(x,\lambda)dx$$

where s(x, λ) is an input signal obtainable from said measured data signal y(t), θ={σ, λ} is a parametric vector recoverable from said measured data signal y(t), and where φ(t, σ) is a Gaussian impulse response of backscattered light from said object having the form:

$$\phi(t,\sigma) = \frac{1}{\sqrt{2\pi}\, \sigma} e^{-\frac{t^2}{2\sigma^2}}$$

where σ is a point spread value.

10. The method as recited in claim 1, wherein said scanner model is defined as:

$$j(t,\theta) = \sum_{k=1}^{n} a_k u(t - t_k,T,\sigma),$$

where $a_k$ is a binary representation of said input data and $p_T$) is a rectangular pulse of width T corresponding to a bar in which $p_T(x)=1$ if $|x|\leq 0.5T$, otherwise $p_T(x)=0$, where:

$$u(t,T,\sigma) = \frac{1}{T} \int_{-0.5T}^{0.5T} \phi(t - x,\sigma)dx$$

and where φ(t, σ) is a Gaussian impulse response of backscattered light having the form:

$$\phi(t,\sigma) = \frac{1}{\sqrt{2\pi}\, \sigma} e^{-\frac{t^2}{2\sigma^2}},$$

and where σ is a point spread value.

11. A method for reading bar code labels, said bar code labels having symbology information encoded therein, said method comprising the steps of:

projecting a source of light across said bar code label;

photodetecting light backscattered from said bar code label, said backscattered light having a time-varying intensity corresponding to said bar code label;

converting said backscattered light into a corresponding time-varying measured data signal y(t);

fitting a scanned signal model j(t, θ) having a plurality of parameters θ to said measured data signal y(t) by adjusting the values of at least one of said parameters θ, said fitting step determining the values of at least one of said plurality of parameters θ using a DEM algorithm, said scanned signal model j(t, θ) capable of having a nonlinear relationship to said plurality of parameters θ; and determining, based on said scanned signal model j(t, θ) and the values of said plurality of parameters θ therein, said symbology information encoded in said bar code label.

12. The method as recited in claim 11, wherein said fitting step uses said DEM algorithm to obtain an input signal s(x) from said measured data signal y(t), and wherein said DEM algorithm is:

$$\theta_{p+1} = \arg\max Q(\theta, \theta_p), \text{ for } p=0, 1, \ldots,$$

wherein:

$$Q(\theta,\theta_p) = \int_{-\infty}^{\infty}\int \log\{\phi(t - x,\sigma)s(x)\}w(t,x,\theta_p)dt dx,$$

where $w(t, x, \theta_p) = \phi(t-x, \sigma)s_p(x)y(t)/j(t, \theta_p)$, and where φ(t, σ) is a Gaussian impulse response of backscattered light having the form:

$$\phi(t,\sigma) = \frac{1}{\sqrt{2\pi}\ \sigma} e^{-\frac{t^2}{2\sigma^2}},$$

where σ is a point spread value.

13. The method as recited in claim 11, wherein said fitting step uses said DEM algorithm to obtain an input signal s(x, λ) defined as:

$$s(x,\lambda) = \frac{1}{T} \sum_{k=1}^{n} a_k p_T(x - t_k),$$

from said measured data signal y(t), where $a_k$ is a binary representation of said input data and $p_T(x)$ is a rectangular pulse of width T corresponding to a bar in which $p_T(x)=1$ if $|x| \leq 0.5T$, otherwise $p_T(x)=0$, said input signal s(x, λ) having a plurality of parameters capable of being solved by said DEM algorithm, said plurality of parameters defined as:

$$a_{k,p+1} = a_{k,p} v_{k,p}$$

$$\sigma_{p+1}^2 = \sum_{k=1}^{n} a_{k,p+1} \sigma_{k,p+1}^2$$

$$t_{l,p+1} = (MB_p - M_{l,p}A_p)/(B_p - A_p^2)$$

$$T_{p+1} = (M_{l,p} - A_p M)/(B_p - A_p^2)$$

where $$A_p = \sum_{k=2}^{n} (k-1)a_{k,p+1},$$

$$B_p = \sum_{k=2}^{n} (k-1)a_{k,p+1}$$

$$M = \int_{-\infty}^{\infty} t\, y(t)dt,$$

$$M_{l,p} = \sum_{k=2}^{n} (k-1)a_{(k,p+1)}t_{k,p+1}$$

$$v_{l,p} = \int_{-\infty}^{\infty} y(x)\phi(x - t_{l,p}, \sigma_{l,p})/j(x;\theta_p)dx$$

$$\sigma_{l,p+1}^2 = \frac{1}{v_{l,p}} \int_{-\infty}^{\infty} (x - t_{p,l})^2 y(x)\phi(x - t_{l,p}, \sigma_{l,p})/j(x;\theta_p)dx.$$

14. The method as recited in claim 11, wherein said fitting step further comprises using zero crossings of said time-varying measured data signal y(t) to determine initial values for at least one of said plurality of parameters θ, said initial parameter values being used by said DEM algorithm as initial estimates for said parameter values.

15. The method as recited in claim 11, wherein said determining step further comprises generating a pulse train corresponding to said scanned signal model j(t, θ) and identifying said symbology information based on said pulse train.

16. A system for reading bar code labels, said bar code labels having at least one data character encoded therein, said bar code label said system comprising:

a photodetector for collecting light backscattered from a bar code label, said backscattered light corresponding to said bar code label; and a receiver in operable connection with said photodetector for converting said backscattered light into a time-varying measured data signal y(t), fitting a scanned signal model j(t, θ) having a plurality of parameters θ to said measured data signal y(t) using a DEM algorithm, and determining said data characters encoded in said bar code label from said scanned signal model j(t, θ) based on the values of said parameters θ when said scanned signal model j(t, θ) is fitted to said measured data signal y(t).

17. The system as recited in claim 16, wherein said receiver uses said DEM algorithm to obtain an input signal s(x) from said measured data signal y(t), and wherein said DEM algorithm is defined as:

$$\theta_{p+1} = arg\ max\ Q(\theta, \theta_p),\ for\ p=0, 1, \ldots,$$

wherein:

$$Q(\theta,\theta_p) = \int_{-\infty}^{\infty} \int \log\{\phi(t - x,\sigma)s(x)\}w(t,x,\theta_p)dtdx,$$

where $w(t, x, \theta_p) = \phi(t-x, \sigma)s_p(x)y(t)/(j(t, \theta_p))$, and where $\phi(t, \sigma)$ is a Gaussian impulse response of backscattered light having the form:

$$\phi(t,\sigma) = \frac{1}{\sqrt{2\pi}\ \sigma} e^{-\frac{t^2}{2\sigma^2}},$$

where σ is a point spread value.

18. The system as recited in claim 16, wherein said receiver uses zero crossings of said time-varying measured data signal y(t) for determining initial values of at least one of said plurality of parameters θ, said initial parameter values usable by said DEM algorithm as initial estimates of said parameter values.

19. The system as recited in claim 16, wherein said receiver generates a pulse train corresponding to said scanned signal model j(t, θ) for identifying at least one data character based on said pulse train.

* * * * *